United States Patent Office 3,189,296
Patented June 15, 1965

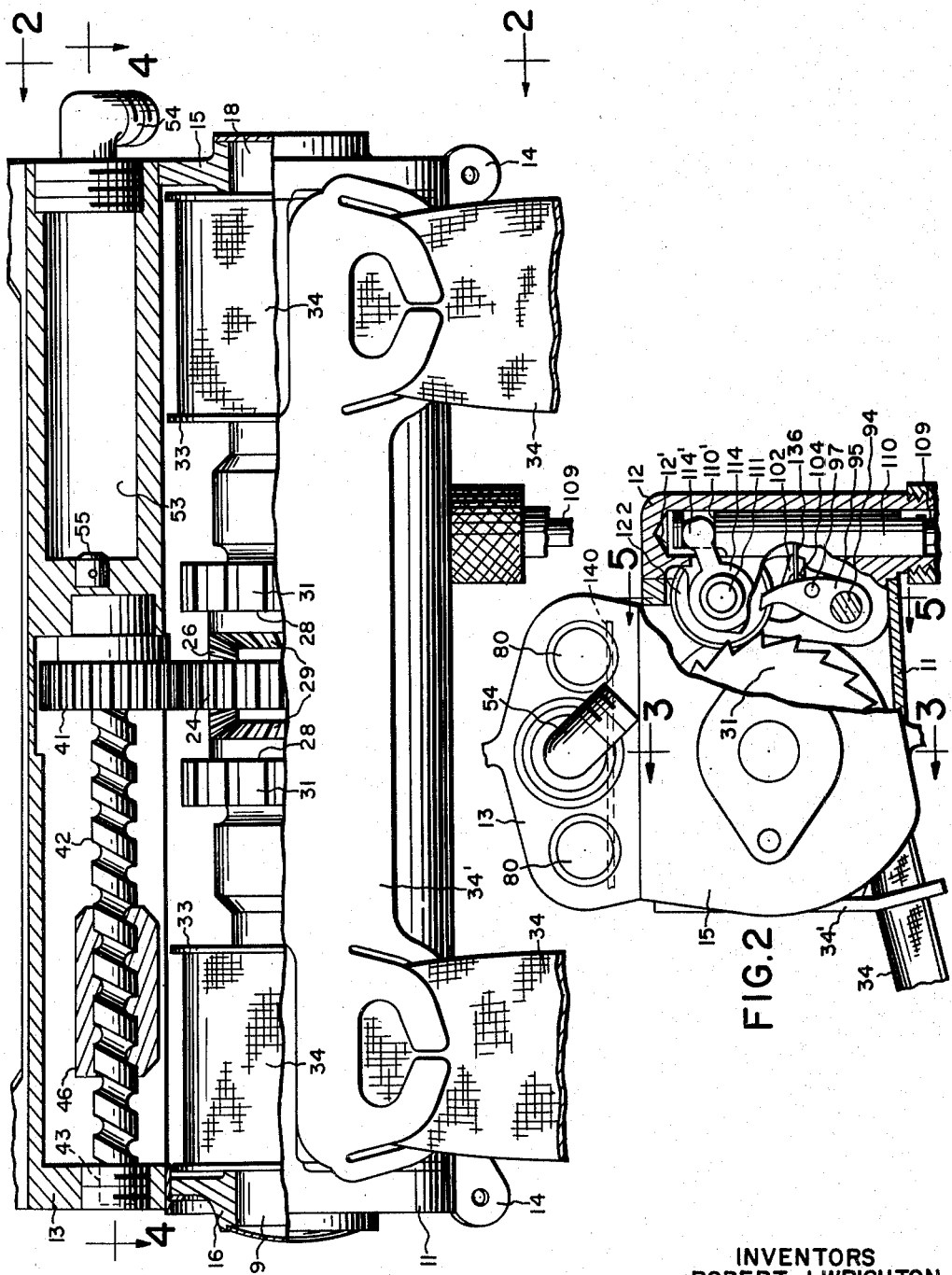

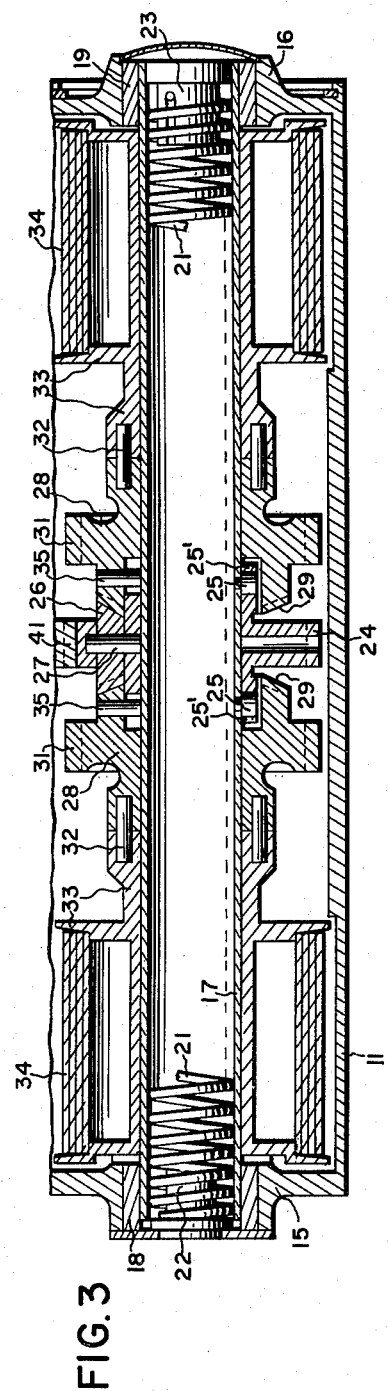
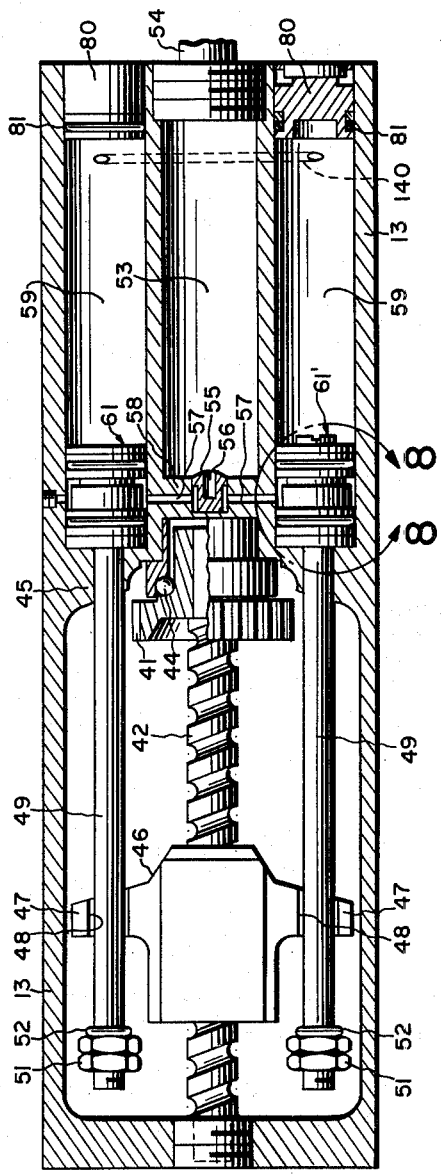
FIG.3
FIG.4
INVENTORS
ROBERT J. WRIGHTON
HOWARD M. LUTTRELL
BY Paul B. Hunter
ATTORNEY

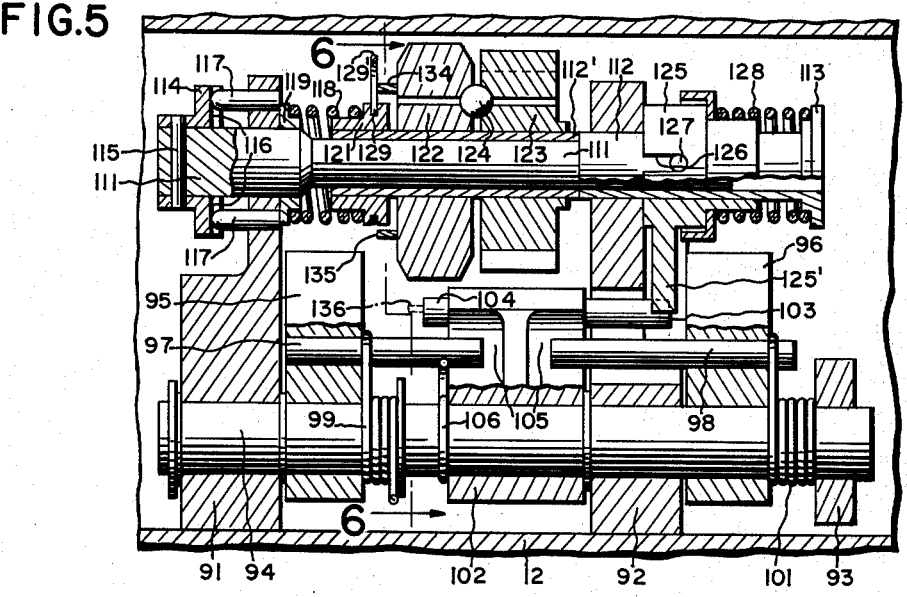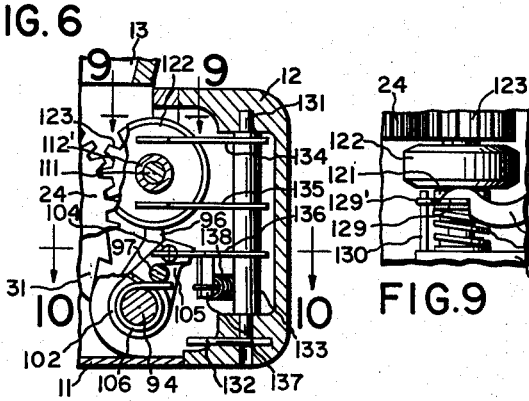

3,189,296
SAFETY HARNESS DEVICE
Robert J. Wrighton, Santa Ana, and Howard M. Luttrell, Anaheim, Calif., assignors to Pacific Scientific Company, San Francisco, Calif., a corporation of California
Filed May 15, 1963, Ser. No. 280,559
13 Claims. (Cl. 242—107.4)

This invention relates, in general, to safety harness devices for use in protecting persons in moving vehicles and, more particularly, to a novel improved inertia operated safety device utilized to automatically lock persons, such as airplane pilots, in their seats during crashes and the like.

The present safety harness device is responsive to the rate of acceleration of the pilot, passenger, or user with respect to his seat and operates directly in response to the acceleration exerted on a strap or webbing resulting from forces applied to the strap through the pilot's shoulder harness by movements of his body, the device operating automatically upon sudden violent movement of the body to secure the pilot or user safely in his seat. The device may also be manually locked and unlocked by the pilot when desired. This device also operates automatically and forcefully to restrain the pilot in his seat during automatic ejection of the seat from the vehicle during those times when the pilot has operated his automatic ejection mechanism. This present invention discloses a novel type of such inertia-operated device which incorporates novel improved features over prior art safety devices now in present use.

It is, therefore, the principal object of the present invention to provide a lightweight, compact, rugged and dependable safety harness device which operates on the principle of rate of acceleration of the harness strap or webbing to retain the pilot or user in his seat in the event of sudden or dangerous movements of the vehicle, this device incorporating a number of new and useful structural features which enhance its dependability in use.

One feature of the present invention is the provision of an inertia-operated safety device which utilizes a pair of tension members or straps for securing the pilot in his seat, the straps being locked up automatically should they exceed a certain outward acceleration due to the pull exerted thereon by the pilot or user thereof, the safety device being provided with a pair of wind-up reels for the straps, this wind-up mechanism being of novel and improved structure over heretofore known forms of wind-up structures for such inertia devices.

Another feature of the present invention is the provision of a dual strap wind-up mechanism of the above-featured type, utilizing a pair of locking dogs, one for each of the two wind-up reels, said dogs arranged so as to release simultaneously for locking up both reels upon automatic or manual lock-up but permitting independent ratcheting over the locking ratchet wheel to permit independent strap retraction between the two reels.

Another feature of the present invention is the provision of a reel of the first above featured type which incorporates a novel mechanism which prevents the unit from locking in response to acceleration forces on the retraction or rewinding cycle of the reel.

Still another feature of the present invention is the provision of a novel means for preventing the safety device from locking up as a result of acceleration forces applied to the reel due to a rebound of the reels as a result of the pilot quickly leaning back in the seat, resulting in the reel building up velocity in the retraction direction.

Still another feature of the present invention is the provision of a reel of the first above featured type wherein differential action is provided between the reels or wind-up spools to provide a balanced force on the straps or webbings during normal extension and retraction and during power retraction, this differential action permitting shoulder movement and slack take-up in the straps during normal use.

Still another feature of the present invention is the provision of a novel form of distant-controlled wind-up mechanism for the safety device wherein forced wind-up of the device may be accomplished by an improved form of charged-gas pressure system, putting high-tension loads into the harness to restrain the pilot in emergency conditions such as seat ejection from the aircraft.

Still another feature of the present invention is the provision of a charged-gas pressure wind-up system of the immediately above featured type arranged so that the force of the gas charge is greater the further the straps are wound out from the safety device, thus insuring a greater force in retracting a pilot who is leaning further out from his seat than normal.

Still another feature of the present invention is the provision of a novel strap guide for the safety device webbing.

These and other features and advantages of the present invention will become apparent after perusal of the following specification taken in connection with the drawings, wherein:

FIG. 1 is an elevation view partly in longitudinal section of the inertia safety device of the present invention;

FIG. 2 is an end view, partly in cross section, of the novel device of FIG. 1 taken along end lines 2—2 in FIG. 1;

FIG. 3 is a longitudinal cross section view of the device of FIGS. 1 and 2 taken along section line 3—3 in FIG. 2;

FIG. 4 is another longitudinal cross sectional view of the novel inertia device taken along section lines 4—4 in FIG. 1;

FIG. 5 is a cross-sectional view of the locking mechanism of this inertia device taken along section line 5—5 of FIG. 2;

FIG. 6 is a cross-sectional view of the locking mechanism taken along section lines 6—6 in FIG. 5;

FIG. 7 is a view of the main shaft gear and associated mechanism of the safety device;

FIG. 8 is an enlarged view of a portion of the piston mechanism of the gas discharge power unit indicated by the section line 8—8 in FIG. 4;

FIG. 9 is a plan view of a portion of the locking mechanism; and

FIG. 10 is a view partly in cross-section of a portion of the locking mechanism taken along line 10—10 in FIG. 6.

Although the present embodiment of this invention is a reel and webbing or strap type of inertia-operated safety device, it should be understood that this invention applies equally well to reel and cable types as well as other types of safety devices. A complete detailed description of the construction of this device will first be given, followed by an explanation of its operation.

Referring now to the drawings, this safety device comprises a metallic casing as of aluminum alloy comprising a main case 11 and a locking mechanism case 12 and power unit case 13 fixedly secured to the main case 11. The main case is provided with integral lugs 14 for mounting the safety device on the pilot's seat, or the like. The main case 11 is closed off at its two ends by bearing walls 15 and 16. A main shaft 17 is rotatably mounted by means of bearings 18 and 19 in the end walls 15 and 16. An elongated torsion spring 21 is secured within the shaft 17, the left-hand end of the spring as viewed in FIG. 3 being fixedly secured by means of a lug 22 to the end wall 15 and thus the case 11, the right-hand end of this spring as viewed in FIG. 3 being secured by means of a plug 23 to the shaft 17, this right-hand end thus being rotatable with the shaft to provide wind-up tension in the spring 21.

A main shaft gear 24 is fixedly secured to the shaft at its central location by means of torqued pins 25 which extend through lugs 25' on the gear 24 and into the shaft 17 (see FIGS. 3 and 7). Thus the main gear 24 and shaft 17 rotate as an integral unit. A bevel gear 26 is rotatably mounted in the main gear 24 by means of pinion gear mounting pin 27, this bevel gear 26 being permitted to rotate within gear 24 on the axis of pin 27 which extends in a direction perpendicular to the axis of rotation of the main gear 24. The strap reel mechanisms located on either side of the main and pinion gear assembly are identical and will bear like reference numerals. These reel mechanisms include ratchet wheels 28 rotatably mounted on the shaft 17, these lock rings having an annular surface containing bevel gear teeth 29 which mesh with the teeth on the bevel gear 26 and also having ratchet teeth 31 which extend around the periphery of the ring. These ratchet wheels 28 are fixedly secured by means of dowel pins 32 to the strap spools or reels 33 which are also rotatably mounted on the shaft 17 and which carry the strap or webbing 34. The webbing extends out through strap guide 34'. The ratchet wheels 28 are provided with stop pins 35 fixedly secured therein, these stop pins serving to engage the lug portions 25' which extend outwardly from the main gear 24 (see FIG. 7), this structure permitting the ratchet wheels 28 to rotate approximately one revolution relative to the main gear.

The power unit gas-operated piston mechanism which is mounted on the case 11 (see particularly FIGS. 1 and 4) includes a power actuator gear 41 which meshes with the main gear 24, this power gear 41 being fixedly secured to one end of a screw rod 42. This screw rod 42 and gear 41 unit is rotatably mounted in a bearing 43 in one end of the casing 13 and in a bearing 44 in a central wall portion 45 in the casing 13. The gear 41 and screw rod 42 are thus arranged to rotate with the main gear 24. A follower member 46 having a threaded central bore is mounted on the screw rod 42 and moves longitudinally thereon as the rod 42 rotates. This follower member 46 is provided with arms 47 having slotted openings 48 therein which accommodate piston rods 49. Stop nuts 51 and O-ring rubber bumpers 52 are secured on the ends of the rods 49 and serve as stops for the follower 46.

The casing 13 is provided with a central chamber 53 on one end thereof to which is fixedly secured a gas inlet plug 54. A T plug 55 is secured within the inner end of this chamber 53, this plug being provided with a gas inlet chamber 56 communicating with side gas access channels or passageways 57 in the inner end wall 58 of the chamber 53, these side gas access channels 57 communicating with the two outer gas piston chambers 59 in the casing 13. The piston rods 49 are adapted to extend through openings in the wall 45 of the casing 13 and into the chambers 59, the ends of these piston rods carrying thereon piston assemblies 61, 61', one of which (61') is of special construction shown more particularly in FIG. 8. The end of the piston rod 49 is enlarged to form a sliding cylindrical piston 62 which slides within the chamber 59. This piston 62 is provided with back-up ring 63 and sealing O-ring 64 located in a groove 65 around the periphery of the piston 62. An annular floating seal 66 is positioned in the inner end of the chamber 59 and also includes a back-up ring 67 and sealing O-ring 68. This floating seal 66 serves to seal off the space around the rod 49 and also serves to seat the piston end 62 of the rod 49. The piston 62 is provided with an internal chamber or cavity which communicates with the region outside the piston through a small port or channel 71. A hollow cylindrical retainer member 72 is screwed into the end of the internal or central chamber of the piston 62, this retainer member being provided with a small end port or opening 73 and a side port 72'. Located within a central region in this retainer member 72 is a resilient plug, for example, a silicone rubber gum plug 74 which abuts against an internal piston member 75. This internal piston member 75 is provided with a grooved peripheral edge carrying O-rings 76 and is also provided with a pin 77 located in the end of the internal piston 75, said pin serving to hold a restricter disc 78 against the internal piston 75. A rubber O-ring 79 is also located between the disc 78 and the retainer member 72. The outer ends of the chambers 59 are closed off by plugs 80 and associated O-rings 81.

The locking mechanism, more particularly shown in FIGS. 2, 5, and 6, includes as integral parts of the casing 12 three fixed walls 91, 92, and 93. A dog support shaft 94 is fixedly secured in these walls, a pair of lock dog members 95 and 96 being rotatably mounted on the shaft 94, these dogs having control pins 97 and 98 fixedly embedded therein. The lock dogs 95 and 96 are tensioned for rotation in a counterclockwise direction as viewed in FIGS. 2 and 6 (into the sheet as viewed in FIG. 5) by means of spiral springs 99 and 101 encircling the shaft 94 and extending out for engagement with the lock dog pins 97 and 98. Also rotatably mounted on the shaft 94 and between the two lock dogs 95 and 96 is a control block 102, said control block having fixedly embedded therein and extending from one side thereof a reset post 103 and from the opposite side thereof a sear rod 104 which has semicircular cross-sectional shape at its outer end. The control block 102 is provided with a recess 105 therein which serves to accommodate the outer ends of the dog control pins 97 and 98. The control block is tensioned against these pins 97 and 98 by means of the spiral spring 106 which encircles the shaft 94 and is tensioned against the one control pin 97.

Also rotatably and slideably mounted in the wall portions 91 and 92 is a control shaft 111 and a control shaft sleeve 112 which encircles the control shaft 111 and is secured thereto, said control shaft sleeve 112 having a flanged outer end 113. A second sleeve 112' is rotatably and slideably mounted on the control shaft 111. A control plunger cam 114 is fixedly secured to the outer end of the control shaft 111 by means of a dowel pin 115. The control plunger cam 114 is provided with an extension arm 114' which extends into an opening 12' in the casing 12 accommodating a control rod 110 slideable therein, the end of arm 114' fitting within a recess 110' in the rod 110. This control rod is connected to a control cable 109 positioned for operation by the pilot in manual locking and in unlocking from either manual or automatic lockup during use. The inside surface of said control plunger cam is provided with a pair of recesses 116, one edge of each of the recesses being beveled so as to provide a slanted sliding surface. These recesses serve to accommodate the outer ends of two cam posts 117, the outer tip of the cam posts having a beveled edge which is adapted to slide along the beveled edge of the recess 116. A spiral spring 118 encircles the control shaft 111 and sleeve 112' and is compressed between a first annular spring support 119 pressed against the surface of wall 91 and a second annular spring support 121 which is affixed to one end of the sleeve 112'. This spring 118 serves to urge the shaft 111 and sleeve 112' in the direction to the right as viewed in FIG. 5, thus urging the cam 114 against the ends of posts 117. A flywheel or inertia wheel 122 is rotatably and slideably mounted on the sleeve 112'. A gear 123 is fixedly secured to the sleeve 112', the surface of the gear 123 which faces the flywheel 122 being provided with three recesses positioned approximately 120 degrees apart. The flywheel 122 is also provided with 120-degree spaced-apart recesses on its inner surface facing the gear 123, these recesses in the flywheel and gear serving to accommodate three steel balls 124 nestling in the recesses.

A reset lever 125 is slideably mounted on the sleeve 112, this reset lever being provided with a longitudinally directed slot 126 which serves to accommodate a pin 127 fixedly secured in the shaft 111. This slot 126 and pin 127 serve to prevent rotational movement of the reset lever 125 relative to the sleeve 112, yet permit a longitudinal or sliding movement of the lever 125 on the sleeve 112. A spiral spring 128 is compressed between the reset lever 125 and the outer flange 113 on the sleeve 112, this spring 128 serving to urge the reset lever 125 in a direction to the left as viewed in FIG. 5 and against the wall 92. The reset lever 125 is provided with an arm extension 125', said arm serving to engage the reset post 103 in the control block 102. The end of the reset post 103 has a beveled surface and the end of the reset lever arm 125' also has a beveled portion which is utilized to cooperate with the beveled surface on the post 103, for reasons to be subsequently described in explaining the operation of this device.

A substantially C-shaped spring member 129 is clamped around the spring support member 121 and nestled in a groove in the periphery thereof, this C-shaped spring member having a loop or extension 129' protruding from the periphery thereof. This C-shaped spring member 129 is arranged generally to move with the spring support 121 due to a friction grip as the support 121 rotates with the sleeve 112', but, upon meeting a restraining means such as post 130 secured in wall 91 or the end of sear arm 134, the spring 129 will remain stationary while the spring support 121 continues rotation in either direction.

A sear pivot rod 131 is secured in the case 12 and is held therein by means of a restraining pin 132. A hollow cylindrical sear 133 is rotatably mounted on the rod 131, this sear being provided with integral lever arms 134, 135 and 136. The lever arm 136 is provided with a lug or extension 137 integral therewith. The outer ends of levers 134 and 135 are arranged to rest against the side of the flywheel 122. The outer end of lever arm 136 is provided with a hooked portion arranged to hook over the level surface of the sear rod 104 embedded in the control block 102. A spiral spring 138 is secured at one end to the case 12 and at the other end to the extension 137 on the lever arm 136, this spring urging the sear 133 in a direction to urge the arms 134 and 135 against the wheel 122 and the lever arm 136 against and hooking over the end of sear rod 104.

A detailed description of the operation of this novel device embodying the present invention will now be given with reference to its use by a pilot in an aircraft. The apparatus is shown in its normal operating position in the drawings, that is to say, when it has not been manually or automatically locked. As the pilot moves about in his seat in a normal manner to control his craft, his shoulders move and pull on the webbing or straps 34, one of which is associated with different ones of the shoulders of the pilot. As both shoulders of the pilot move back and forth in his seat in a uniform manner, the webbings 34 play out from the device on outward movement of the pilot against the tension of the spring 21, the spring 21 serving to maintain the webbing 34 taut. As the pilot sits back in his seat, the spring 21 serves to wind up the webbing 34 on the reels 33. As the reels 33 rotate in the unwind and wind-up direction on the shaft 17, they drive the main gear 24 in rotary direction by way of the bevel gear 26 which meshes with the teeth on the ratchet wheels 28. This main gear 24 in turn drives the gear 41 which rotates and thus causes the follower 46 to move longitudinally back and forth on the screw rod 42. The gear 24 also drives the gear 123 in the locking mechanism which, via the steel balls 124, drives the inertia member 122 in a rotary direction along with the gear 123. Provided the rate of pay-out of the webbing does not exceed a predetermined acceleration, the inertia member 122 will move in a rotational direction in unison with the gear 123. Operation of the locking mechanism during excess acceleration in the pay-out direction will be described below.

This safety device provides a differential action between the two wind-up reels. During equal unwind of the straps 34 from the reels 33, the bevel gear 26 does not rotate within the main gear 24 but it serves to drive the main gear 24 from the ratchet wheels 28 in a balanced manner. However, if the pilot is pivoting in his seat so that one of his shoulders is moving outwardly a greater distance than the other shoulder, the reel attached to the one outwardly moving shoulder will rotate in a pay-out direction and, through the bevel gear 26, the reel attached to the other shoulder will be rotated in a wind-up direction so as to take up the slack on the shoulder strap which is pivoting back toward the seat. This bevel gear 26 thus permits one strap to be unwinding while the other strap is being rotated in a wind-up direction and vice versa. The stop pins 35 in the ratchet wheels 28 will permit approximately one revolution of differential rotation between the two reels before the stop pins strike the lugs 25' on the gear 24 to restrict further rotation. It should be noted that at the same time the bevel gear may be rotating within the main gear 24 to provide this differential pay-out and take-up action on the two reels 33, the main gear 24 may also be rotating in the take-up or pay-out direction to accommodate outward or inward movement of the body of the pilot even while he might be rotating his shoulders to bring the differential action into play.

Should the pilot desire to secure himself safely in his seat when, for example, a crash is imminent, he leans back in his seat and the slack in the two harness webbings 34 is taken up by the safety device which rotates under the tension spring 21 to wind-up the webbing on the reels 33. During the time he is returning to his seat or after he has leaned entirely back in his seat, the pilot operates the main control lever (not shown) located handy to his reach, thereby pulling the cable 109 and control rod 110 in an outward direction from the casing 12, that is, downwardly as viewed in FIG. 2, thus rotating the control plunger cam 114 through its arm 114' in a clockwise direction as viewed in FIG. 2. Rotation of the cam 114 causes the beveled surfaces in its recesses 116 to ride up on the beveled surfaces on the cam posts 117, thus causing the control cam 114 and the associated shaft 111 to move in an axial direction to the left as viewed in FIG. 5. The shaft 112', the gear 123, and, through the steel balls 124, the flywheel 122 and the lever arms 134 and 135 all move to the left as viewed in FIG. 5, thus causing the sear 133 to rotate and to in turn rotate the lever arm 136 from latching engagement with the end of rod 104, thus releasing the control block 102 from its latched position. The control block 102 under the urging of the spiral springs 99 and 101 which act on rods 97 and 98 rotates in a clockwise direction as viewed in FIG. 6, thus permitting the two lock dogs 95 and 96 to rotate, also under the urging of springs 99 and 101, into engagement with the teeth 31 on the two ratchet wheels 28. These lock dogs prevent the ratchet wheels from rotating in a webbing pay-out direction, although they will ratchet over the teeth to permit the ratchet wheel and the associated webbing wind-up reels to rotate in a webbing take-up direction should the pilot be leaning forward when he operates the locking mechanism. Thus the power spring 21 will take up the slack webbing 34 on the reels 33, the lock dogs falling in behind each successive ratchet tooth on the ratchet wheels 28. It should also be noted that the lock dogs may ratchet independently of each other since they are only indirectly coupled to each other by way of rods 97 and 98 and the common control block 102.

The control shaft 111 in rotating to cause release of the ratchet lock dogs also rotates the reset lever 125 until the outer end of the extension finger 125', which is beveled, contacts the beveled outer tip of the reset post 103. The end of the extension arm 125' rides up and over the end of the reset rod 103, the reset lever 125 moving or sliding along the sleeve 112 to the right as viewed in FIG. 5 against the tension of the spiral spring 128 to permit the arm 125' to ride over the post 103. When the arm has passed over the post 103, the reset lever 125 slides back to the left as viewed in FIG. 5 along the sleeve 112 under the urging of the spiral spring 128, and thus lever arm 125' drops down behind the rod 103. The mechanism is thus cocked for subsequent resetting of the locking dogs 95, 96.

This device will thereafter remain locked until the pilot acts to unlock it by pushing the control rod 110 into the casing 12 and thus rotating the control plunger cam 114 in a counterclockwise direction as viewed in FIG. 2. Rotation of control plunger cam 114 causes rotation of the control shaft 111 and the reset lever 125, the extension arm 125' of the reset lever contacting the rod 103 and driving the control block 102 in a counterclockwise direction as viewed in FIG. 6. In rotating, the control block 102, through lock dog pins 97 and 98, drives the lock dogs 95 and 96 to their unlocked position. Upon reaching the unlocked position, the sear rod 104 engages the beveled end of the sear lever 136, causing the sear lever 136 to ride up and over the end of the rod 104, the end of lever 136 hooking over the rod 104 to hold the control block 102 and the associated lock dogs 95 and 96 in their unlocked position. During this rotation of the cam 114, the recesses 116 engage the ends of posts 117 and permit the shaft 111 and associated mechanism to return to the position shown in FIG. 5. The continued rotation of the control shaft 111 and the reset lever 125 causes the extension arm on the reset lever 125 to again ride over the end of the rod 103 until the mechanism is returned to its normal position awaiting the manual or automatic lock at a subsequent time.

The novel apparatus of this invention will automatically operate to lock up the webbing straps 34 during crashes and the like if the pilot does not manually lock it. This safety device is so arranged that when any loading on the webbing straps 34 causing an acceleration of a particular number of G's or over occurs, depending on the setting of the device, the webbing 34 will be locked up against further pay-out. Assuming that the aircraft in landing strikes an object and decelerates rapidly, pitching the pilot forward in his seat, or that the craft yaws or descends suddenly, so that the pilot's body exerts a loading of this particular number of G's acceleration on the webbing 34, this force rotates the reels 33 and the associated main gear 24 through the medium of the ratchet wheels 28 and the beveled gear 26. The main gear 24 in turn rotates the lock mechanism gear 123 and, through the sandwiched steel balls 124, the inertia wheel 122 at a rapid rate of acceleration. Since the flywheel is made of a relatively heavy metal mass, it tends to remain stationary when the force is first applied. This tendency of the flywheel to remain stationary overcomes the spring loading force exerted on the flywheel by the spring loaded lever arms 134 and 135 which are spring tensioned by the sear spring 138. There is, therefore, a relative rotational movement between the gear 123 and the flywheel 122 causing the balls 124 to ride up in the recesses and to spread the wheel 122 away from the gear 123. This longitudinal movement of the wheel 122 causes the lever arms 134 and 135 and the associated lever arm 136 to rotate, the end of the lever arm 136 being disengaged from the end of the sear rod 104, thus permitting the control block 102 and lock dogs 95 and 96 to be released to move into locking engagement with the ratchet wheels 28 and thus locking the reels against further strap pay-out to retain the user in his seat. In this automatically locked position, the apparatus will still reel in the webbing should the user move back in his seat in the same manner as explained above when the strap was wound up during the manual lock condition.

The sear spring 138 is utilized to control the exact number of G's of acceleration of the webbing which are necessary to lock this safety device automatically. The tension of the sear spring may be varied by means of the adjusting screw means 138' which serves to secure the end of the sear spring to the casing 12. The components of this safety device may be selected as to size, weight, etc., so that the device may cover wide ranges of acceleration. In one embodiment of this device constructed, the locking acceleration was set at approximately 2 G's.

To release from the automatic locked position, the pilot pulls out the control rod 110 to rotate the reset control plunger cam 114 in a clockwise direction as viewed in FIG. 2 for causing the reset lever 125 to rotate and move its extension arm 125' over the end of the reset post 103 and behind it, as described above. The subsequent return of the rod 110 into the casing 12 causes counterclockwise rotation of the reset lever (as viewed in FIG. 2) and engagement with the reset post 103 by the arm 125', thus driving the reset post 103 and the associated control block 102 and, through lock dog pins 97 and 98, the lock dogs 95 and 96 to an unlocked position with the lever arm 136 hooked over and holding the sear rod 104.

This device is provided with an anti-lock mechanism which prevents the reel from locking up during the time of rewinding of the webbing on the reels and also to prevent the mechanism from locking up due to rebounding of the inertia wheel when the mechanism is brought to a sudden stop after full retraction. This mechanism includes the C-shaped spring member 129 secured around the spring support 121. This spring member 129 will rotate with the spring support 121 during rotation of the sleeve 112' in the unwind direction until the extension 129' of the spring strikes the post 130, which will hold the spring 129 from further rotation with the spring support, the C-shaped spring 129 sliding in the groove. During the webbing retraction movement, the spring 129 rotates in the opposite direction approximately 45 degress until the extension loop 129' moves behind the lever arm 134, this loop 129' engaging a shoulder on the lever arm 134 and stopping in this position behind the arm. The arm 134 is unable to move to the left as viewed in FIG. 5, being restrained by the loop 129'. Therefore, no automatic locking of the mechanism can be accomplished while the spring 129 is so positioned. However, manual locking of the reel may still be accomplished even during this retraction cycle since on such cycle the gear 123, wheel 122, spring support 121, and associated C-spring 129 all move as a unit to the left as viewed in FIG. 5, thus moving the sear lever arms 134 and 135 and permitting the lever arm 136 to become disengaged from the rod 104 to release the lock dogs. The C-spring arm 129' moves behind the lever arm 134 to a small extent so that even should the wheel 122 and associated spring support member 121 rebound slightly at the end of retraction, the C-spring will still remain partially behind the end of the lever arm 134. Approximately a 45 degree rotation of the sleeve 112' in the wind-up direction is necessary in order to bring the spring loop 129' out from behind the sear lever arm 134 to again permit the lock mechanism to operate on automatic lock cycle.

This device is also provided with a power mechanism to forcefully wind up the webbings on the reels and pull the pilot back into his seat in certain circumstances. If, for example, the device is utilized on an ejection seat in an aircraft, the pilot, while preparing for ejection, will operate this power mechanism to forcefully secure himself into the seat before ejection. To accomplish this result, a ballistic gas discharge is utilized from a suitable gas generator, such as an integral ballistic gas generator, coupled to the gas inlet plug 54. This gas is introduced into the central chamber 53 and passes through the T-plug 56 and is ported out through channels 57 into the piston chambers 59. This pressure, acting on the front-side of the piston heads 62 on the rods 49, causes the pistons to travel down the chambers 59 toward the end plugs 80. When traveling, the piston rods 49 pick up the follower nut 46 by means of the stops 51 and draw the follower nut toward the gear 41. The longitudinal movement of the nut 46 causes rotational movement of the screw rod 42 and gear 41 which in turn drives the main gear 24 in a direction to wind up the two webbings 34 on their associated reels 33 and thus forcefully retract these webbings and force the pilot snugly to the back of his seat. The volume of the chamber 59 is sealed, causing a compression of the trapped air in this area which acts as a damper for the moving pistons.

Ballistic gas generator cartridges have the characteristic that they increase their burning rate as a function of pressure. For example, a cartridge fired into a closed chamber having a small volume will burn much faster and therefore build up much higher pressures than the same cartridge fired into a larger closed chamber. The present device is designed so as to utilize this particular characteristic of ballistic charges. If the pilot is leaning forward which, for example, may be the case if the forces acting on the pilot are very strong and are forcing him to his forwardmost position, the follower nut 46 will be in its outermost position or furthest to the left as viewed in FIG. 4, and the volume behind the piston 61 will be very small at the time the stops 51 first engage the follower nut 46 to load the mechanism for forcefully winding up the pilot. This small volume behind the piston will cause the cartridge to burn faster and therefore build up higher pressures to produce this winding force. If, on the other hand, the pilot is only leaning half-way forward, the situation which would occur under less force exertion on the pilot who may be partially restraining himself in his seat, the follower nut 46 will only be half-way along the screw rod 42 and, by the time the drive nuts 51 engage the follower 46, the volume behind the pistons 61 will be larger than in the full pay-out position and the pressure will be less, which is satisfactory since the loading force on the mechanism under such circumstances will be less.

This device is also designed so that it will retain its pressure after being ballistically fired and also that it will be able to return to normal inertia reel operation after being fired. This is accomplished in the present device by permitting the pressure to balance out on both sides, that is, the front and back sides, of the pistons 61, 61' after the initial power retraction work has been completed. By balancing the pressure on both sides, that is, the front and back sides of the pistons, the piston is caused to return to the starting position since the area on the back side of the piston is greater than the area on the front side by the amount of the area of piston shaft 49.

In order to accomplish the power retraction operation and to then permit leakage to balance the power on both sides of the piston, a time delay has been incorporated in one of the pistons 61' as shown more fully in FIG. 8. The two chambers 59 on the back sides of the pistons are interconnected by a small cross-port 140 so that only one point of leakage, i.e. through one of the pistons, is necessary to balance both piston systems.

The operation of this time delay and pressure bleed is as follows with reference to FIG. 8. Pressure to operate the piston is exerted on the front side (left hand side) of the piston 62 through the inlet channel 57. This pressure, in addition to operating on the front side of the piston to cause it to move into the chamber 59 and retract the webbing, also passes through the port 71 into the chamber within piston 62 and against the internal piston 75. There are holes 141 in the restricted disc 78 which permit this pressure to be exerted on the front side of the internal piston 75. During the period of full power retraction, approximately one-half second, pressure is exerted on the internal piston 75 causing it to move to the right as viewed in FIG. 8 within the retainer member 72, causing the silicon gum rubber 75 to be extruded out through the small port or hole 73 in the end of the retainer member 72. When the silicon gum has been extruded, taking approximately one second, the small port 72' in the side of the retainer becomes exposed to the back side of the piston 62 through a small transverse slot 142 crossing the threads of retainer 72, allowing the pressure to pass through the port 72' to the back side of the piston 62. When the pressure balances on the front and back sides of both of the pistons 61 and 61', the pistons return to their normal position as shown in FIG. 4 due to the differential pressure exerted on them because of their difference in surface area, as noted above. The course of gas flow during the piston return is through the side port 72' in the retainer 72 and back out through the small port 71 in the piston 62. The pin 77 drops down at a slight angle when the internal piston 75 has reached its full travel and has become disengaged from the pin 77. This keeps the passage open for return of the pistons 61, 61'.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An inertia operated safety device for mounting on a vehicle to restrain the movement of a body within the vehicle where the body is subjected to accelerated movements relative to the vehicle comprising a pair of tension members for coupling to the body, a pair of reels on which said tension members are wound, a main shaft on which said reels are rotatably mounted, a main gear fixedly secured to said shaft and positioned between said reels, a pair of ratchet wheels fixed respectively to said respective reels on opposite sides of said main gear, said ratchet wheels having bevel gear teeth, and a bevel gear carried by said main gear and meshing with said bevel gear teeth, whereby said tension members may be moved independently of each other in use to permit independent movement of the shoulders of the body, stop means interposed between said main gear and said ratchet wheels for limiting said independent movement, said bevel gear serving for coupling said reels to said main gear to cause said main gear to rotate in unison with said reels during rotation in the wind-up and unwind direction, yieldable resilient means coupled to said shaft tensioned so as to urge said shaft in the direction to rotate said reels through said main gear in a direction to wind up said tension members thereon, said reels, main gear, and shaft being rotatable against the tension of said resilient means in a direction to unwind the tension members from the reels responsive to movements of the body, a second shaft, a second gear rotatably mounted on said second shaft meshing with said main gear, a flywheel rotatably mounted in axial alignment on said second shaft, second yieldable means coupling said flywheel to said second gear to rotate said flywheel in unison with said second gear during rotation thereof in the unwind direction of the reels below a certain acceleration, said second yieldable means yielding during rotation of said second gear at said certain acceleration whereby said second gear rotates relative to said flywheel, and locking means comprising a pair of lock dogs respectively positioned adjacent said respective ratchet wheels and operated in response to the yielding of said second yieldable means for engaging said ratchet wheels and locking said reels against further rotation in the reel unwind direction, said lock dogs by respectively locking a respective one of said ratchet wheels and associated reel providing an exceedingly rugged and reliable lock for said reels in use.

2. An inertia operated safety device as claimed in claim 1 wherein said second yieldable means includes a pivoted sear lever arm, spring means engaging said sear lever arm to tension it against said flywheel, said sear lever arm and said spring means yielding to effect operation of said locking means, and restraining means for preventing said sear lever arm and spring means from yielding during rotation of said reels and said flywheel in the tension member wind-up direction.

3. An inertia operated safety device as claimed in claim 2 wherein said restraining means comprises means for moving into contact with said sear lever arm during rotation of the reels and flywheel in the wind-up direction to prevent yielding movement of said sear lever arm during wind-up rotation.

4. An inertia operated safety device as claimed in claim 3 wherein said restraining means comprises means for rotating with said flywheel in the wind-up direction into initial engagement with said sear lever arm, said restraining means rotating with said flywheel in the unwind direction out of engagement with the sear lever arm.

5. An inertia operated safety device as claimed in claim 4 wherein said restraining means rotates approximately 45 degrees in the unwind direction to remove itself from contact with said sear lever arm.

6. An inertia operated safety device as claimed in claim 1 comprising spring means for urging said lock dogs into locking engagement with said ratchet wheels, said locking means including means for releasing said lock dogs simultaneously in response to the yielding of said second yieldable means to thereby lock both of said reels against rotation in the unwind direction.

7. An inertia device as claimed in claim 6 wherein said means for releasing said locking dogs permits independent operation of said lock dogs to permit said reels to wind-up independently of each other during the period said lock dogs are operated to lock said reels against movement in the unwind direction.

8. An inertia operated safety device as claimed in claim 1 including a third gear mounted to mesh with said main gear and rotate therewith, a screw rod fixedly secured to said third gear, a follower nut on said screw rod, piston means for at times moving said follower nut along said screw rod to rotate said third gear in a direction to in turn rotate said main gear to wind up the webbing on said reels, and fluid conducting means for delivering fluid pressure to said piston means for causing wind-up of said webbing reels.

9. An inertia operated safety device for mounting in a vehicle to restrain the movement of a body within the vehicle when the body is subjected to accelerated movements relative to the vehicle, comprising a pair of tension members for coupling to the body, a pair of reels on which said tension members are wound, a main shaft on which said reels are rotatably mounted, a main gear fixedly secured on said shaft between said reels, said main gear having its axis in axial alignment with said shaft, a second gear rotatably mounted in said main gear for rotational movement about an axis normal to the axis of rotation of said main gear and main shaft, means for coupling said reels to said second gear, said reels driving said main gear in rotation therewith through said second gear, said second gear permitting relative rotation between said two reels, resilient means coupled to said shaft tensioned so as to urge said shaft in the direction to rotate said reels in a direction to wind up said tension members thereon, said reels, main gear, and shaft being rotatable against the tension of said resilient means in a direction to unwind the tension members from the reels responsive to movements of the body, a second shaft, a third gear rotatably mounted on said second shaft and meshing with said main gear so as to be driven thereby, a flywheel rotatably mounted in axial alignment on said second shaft, second yieldable means coupling said flywheel to said third gear to rotate said flywheel in unison with said third gear during rotation thereof in the unwind direction of the reels below a certain acceleration, said second yieldable means yielding during rotation of said shaft at said certain acceleration whereby said third gear rotates relative to said flywheel, and locking means operated in response to the yielding of said second yieldable means for locking said reels against further rotation in the reel unwind direction.

10. An inertia operated safety device as claimed in claim 9 wherein said locking means comprises a pair of locking rings, separate ones being fixedly secured to separate ones of said pair of reels, and a pair of lock dogs, separate ones being associated with separate ones of said locking rings, spring means for urging said lock dogs into locking engagement with said lock rings, said locking means including means for releasing said lock simultaneously in response to the yielding of said second yieldable means to thereby lock both of said reels against rotation in the unwind direction.

11. An inertia device as claimed in claim 10 wherein said means for releasing said locking dogs permits independent operation of said lock dogs to permit said reels to wind-up independently of each other during the period said lock dogs are operated to lock said reels against movement in the unwind direction.

12. An inertia operated safety device as claimed in claim 9 including a fourth gear mounted to mesh with said main gear and rotate therewith, a screw rod fixedly secured to said fourth gear, a follower nut on said screw rod, piston means for at times moving said follower nut along said screw rod to rotate said fourth gear in a direction to in turn rotate said main gear to wind up the webbing on said reels, and fluid conducting means for delivering fluid pressure to said piston means for causing wind-up of said webbing reels.

13. An inertia operated safety device for mounting on a vehicle to restrain the movement of a body within the vehicle where the body is subjected to accelerated movements relative to the vehicle comprising a tension member for coupling to the body, a rotatable reel on which said tension member is wound, yieldable resilient means coupled to said reel and tensioned so as to urge said reel to rotate in a direction to wind up said tension member thereon, said reel being rotatable against the tension of said resilient means in a direction to unwind the tension member therefrom responsive to movements of the body, a flywheel rotatably mounted in said device, second yieldable means coupling said flywheel to said reel to rotate said flywheel in unison with said reel during rotation thereof in the unwind direction below a certain acceleration, said second yieldable means yielding during rotation of said reel at said certain acceleration whereby said reel rotates relative to said flywheel, locking means operated in response to the yielding of said second yieldable means for locking said reel against further rotation in the reel unwind direction, said locking means having a normal position it assumes when the reel is in the unlocked condition and a locked position when the reel has been locked against further unwind of the tension member, and power wind-up means coupled to said reel to at times forcefully wind-up said reel, said power wind-up means comprising a sealed fluid pressure chamber, a piston slideably mounted in said chamber and movable in one direction response to a fluid charge introduced into said chamber, means coupled to said piston and coupled to said reel whereby movement of said piston in said one direction due to said fluid charge causes said reel to rotate in the wind-up direction, said position having a passage between its front and back sides, and time delay means within said piston normally closing said passage, said time delay means acting at a predetermined interval after movement of said piston under fluid pressure to permit the pressure to leak through said piston passage and balance the pressure on either side of said piston to permit return movement of said piston in the opposite direction to thereby permit rotation of said reel in the unwind direction.

References Cited by the Examiner

UNITED STATES PATENTS

| | | | |
|---|---|---|---|
| 2,680,476 | 6/54 | Saffell | 244—122 X |
| 2,899,146 | 8/59 | Barecki | 242—107.4 |
| 3,064,920 | 11/62 | Cushman et al. | 242—107.4 |
| 3,105,662 | 10/63 | Wrighton | 242—107.4 X |

MERVIN STEIN, *Primary Examiner.*